DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 9

T883,004

PRODUCTION OF LAMINATES

Denis James Henry Sandiford and Alan George Smith, Welwyn Garden City, England, assignors to Imperial Chemical Industries Limited, London, England, a corporation of Great Britain

Filed Oct. 27, 1969, Ser. No. 869,859

Claims priority, application Great Britain, Nov. 6, 1968. 52,658/68

Int. Cl. B29d *27/04*

U.S. Cl. 264—45

No Drawing. 10 Pages Specification

A laminate of synthetic polymeric materials is produced by an injection molding process wherein the first layer of the laminate is injected into a mold through a first sprue. The first injection is permitted to cool to be sufficiently self-supporting to prevent the material of the first injection from blocking the second injection. The mold cavity is subsequently enlarged, and a second amount of polymeric material is injected into the mold through a second sprue extending through the first layer formed by the first injection.

The two layers may be of the same or different polymeric materials, and may be thermoplastic or thermosetting. Fillers may also be present in the polymeric material. One of the layers, preferably the second, may be a foamable composition. Laminates produced according to the process are useful in the production of large area moldings, such as door panels, interior trim panels of automobiles, and any application in which a smooth surface attached to a bulky backing is required.